United States Patent [19]

Drago et al.

[11] Patent Number: 4,719,190

[45] Date of Patent: Jan. 12, 1988

[54] HYDROCARBON CONVERSION AND POLYMERIZATION CATALYST AND METHOD OF MAKING AND USING SAME

[75] Inventors: Russell S. Drago; Edward E. Getty, both of Gainesville, Fla.

[73] Assignee: University of Florida, Gainesville, Fla.

[21] Appl. No.: 921,688

[22] Filed: Oct. 22, 1986

[51] Int. Cl.$^4$ .................... B01J 29/06; B01J 27/125; B01J 27/10
[52] U.S. Cl. .................................... 502/64; 502/202; 502/224; 502/226; 502/227; 502/231; 208/116; 208/117; 585/422; 585/727; 585/744; 585/747

[58] Field of Search ................. 502/64, 231, 227, 202, 502/226, 224

[56] References Cited

U.S. PATENT DOCUMENTS

| | | | |
|---|---|---|---|
| 3,248,343 | 4/1966 | Kelly et al. | 502/231 |
| 3,960,711 | 6/1976 | Antos et al. | 502/227 X |
| 3,993,587 | 11/1976 | Olah et al. | 502/231 X |

*Primary Examiner*—Patrick P. Garvin
*Attorney, Agent, or Firm*—Dennis P. Clarke

[57] ABSTRACT

Method of preparing a hydrocarbon conversion and polymerization catalyst comprising reacting an adsorbent containing surface hydroxyl groups with a Lewis acid in a halogenated organic solvent.

25 Claims, No Drawings

HYDROCARBON CONVERSION AND POLYMERIZATION CATALYST AND METHOD OF MAKING AND USING SAME

BACKGROUND OF THE INVENTION

1. Field of the Invention

The present invention relates to improved hydrocarbon conversion and polymerization catalysts.

2. Prior Art

Aluminum halides, e.g., aluminum chloride, usually positioned on a variety of solid adsorbent surfaces, have been extensively employed as catalysts for many hydrocarbon conversion reactions. Such catalysts have found wide-spread use in alkylation, isomerization, and cracking reactions. Although aluminum halides may be employed alone, i.e. as bulk catalysts, or as a liquid complex with a variety of organic compounds, they are most conveniently employed in a form wherein they are absorbed on an adsorbent material support such as alumina, silica, charcoal, bauxite, etc.

A common method for preparing such supported catalysts comprises forming an aluminum halide vapor in the presence of a suitable adsorbent material whereby the aluminum halide is adsorbed by the support surface. The aluminum halide may simply be vaporized in the so-called sublimation procedure. According to another procedure, aluminum chloride vapors are admixed with a carrier gas, i.e., a hydrocarbon, and contacted with the adsorbent material.

Optionally, molten aluminum chloride can be contacted with the adsorbent material and excess aluminum halide removed by vaporization.

According to another procedure, a solution of aluminum halide and a hydrocarbon can be passed in contact with the adsorbent material until the desired amount of aluminum halide has been adsorbed by the support material.

An improved method is described in U.S. Pat. No. 3,248,343 wherein aluminum halide vapor is actually reacted with the surface hydroxyl groups on an adsorbent material to form —O—AlCl$_2$ groups. The resulting reaction product is then "associated" with hydrogen halide to form a particularly active hydrocarbon conversion catalyst.

U.S. Pat. No. 4,066,716 suggests that an active alkylation catalyst can be formed by contacting a chlorided alumina composite catalyst with vaporized aluminum halide to add additional chlorine to the catalyst.

U.S. Pat. No. 2,927,087 describes a process wherein an aluminum halide is vaporized onto a refractory oxide and subsequently heated at a temperature above 300° C. to remove any unreacted aluminum halide. It is suggested in the patent that there is an actual chemical reaction between the vaporized aluminum halide and the refractory oxide surface.

It is an object of the present invention to provide new and improved hydrocarbon conversion catalysts formed by a unique and novel method and their use in hydrocarbon conversion procedures.

SUMMARY OF THE INVENTION

The foregoing and other objects and advantages are provided by the present invention which contemplates a method of preparing a catalyst comprising reacting an adsorbent solid containing surface hydroxyl groups with a Lewis acid selected from the group consisting of aluminum halides, antimony halides and mixtures thereof in a halogenated organic solvent selected from: the group consisting of CCl$_4$, CHCl$_3$ and mixtures thereof at a temperature and for a time sufficient for said aluminum halide to react with at least a portion of said surface hydroxyl groups.

An additional embodiment of the invention comprises the catalyst prepared according to the above described method.

The invention further contemplates an improved hydrocarbon process wherein at least one hydrocarbon is contacted with a conversion catalyst under conversion conditions, the improvement comprising contacting the hydrocarbon(s) with the above described catalyst.

A still further embodiment of the invention comprises an improved polymerization method wherein a monomer or mixture of monomers is contacted under polymerization conditions with a free radical polymerization catalyst, the improvement comprising contacting the monomer or mixture of monomers with the above described catalyst.

DETAILED DESCRIPTION OF THE INVENTION

While it is in no way intended to limit the invention by the soundness or accuracy of any theories set forth herein to explain the nature of the active catalyst species, it is postulated that, under the conditions of the reaction and because of the nature of the reaction mixture, the aluminum and/or antimony halide molecules react with the surface hydroxyl groups of the absorbent surface to form tetrahedral metal halide groups (AlX$_2$ or SbX$_4$ wherein X is a halide) thereon. It is further postulated that the tetrahedral structure of the metal halide groups bound to the adsorbent surface gives rise to an unexpectedly high degree of catalytic activity.

It is critical to the success of the invention that the catalyst be prepared employing the halogenated solvents listed above. The utilization of other solvents or the elimination of solvents altogether result in the formation of products having significantly decreased activities.

It is also critical to the success of the invention that the method be carried out at relatively mild temperature conditions inasmuch as exposure of the active catalyst to temperatures above about 250° C., significantly decreases the activity of the catalyst. Preferably, the reaction is carried out at between about 50° C. and about 80° C. in order to optimize production of the catalyst and avoid decreasing the activity thereof.

Again, it is postulated that the nature of the solvent and the reaction conditions are critically responsible for formation of the tetrahedral structure of the groups which is, in turn, responsible for the high degree of catalytic activity associated with the composite catalyst.

Evidence that these parameters are responsible for the production of a unique and novel structure is contained in the examples hereinbelow which reveal a unique purple or red color associated with the active catalyst species of the invention as opposed to the product produced when operating outside of these critical parameters.

Following the reaction, the catalyst may be separated from the reaction mixture according to any conventional procedure for removing solids from liquids, e.g., filtration, centrifugation, etc.

Contact with water and bases should be avoided in order to avoid decomposition or inactivation of the catalyst.

Any adsorbent solid containing surface hydroxyl group may be employed in the practice of the invention. Exemplary of such materials are silica, alumina, boron oxide, a zeolite, magnesia, or titania containing materials or mixtures thereof. The selection of a suitable adsorbent solid will depend in each case upon the intended use of the catalyst since the nature of the support material often affects the reaction rate, selectivity or other parameter of the reaction to be catalyzed by the active species.

Any aluminum or antimony halide, i.e., chloride, bromide, fluoride and iodide may be employed in the practice of the invention. For reasons not altogether clear, the aluminum halide catalysts have a significantly higher activity than the corresponding antimony halide catalysts. Accordingly, the aluminum halide catalysts are particularly preferred in the practice of the invention.

A particularly preferred procedure for preparing the catalysts of the invention involves refluxing a reaction mixture of the adsorbent solid, the aluminum halide and the solvent under an inert atmosphere ($N_2$) and in the absence of light for the time required for the reaction to go to completion, usually when the reaction mixture develops a deep purple or red, almost black color, generally in from about 1 hour to about 5 days.

The catalysts prepared according to the method of the invention may be utilized in any chemical reaction in which aluminum and antimony halides have been employed as catalysts.

The catalysts find particularly valuable applications in hydrocarbon conversion reactions. For example, the catalysts may be employed in the cracking of long chain hydrocarbons, e.g. heptane, butane, etc., to produce shorter chain products such as ethane, propane, butanes, etc.

In addition, the catalysts may be used to catalyze the isomerization of normal alkanes to their branched chain isomers.

Other hydrocarbon conversion reactions which are catalyzed by the products of the invention are alkylations, e.g., the alkylation of alkanes with olefins.

The catalysts of the invention also find utility as free radical catalysts in, e.g., polymerization reactions such as the co-polymerization of styrene and methyl methacrylate.

Finally, the catalysts may be utilized as electron paramagnetic resonance standards.

The invention is illustrated by the following non-limiting examples.

EXAMPLE 1

In a 250 ml 3-neck round bottom flask equipped with a reflux condensor and teflon coated magnetic stir bar was placed 10.20 g of silica gel (washed with 1 M HCl and dried under vacuum at 80° C. for 72 hrs) and 150 ml of carbon terachloride (dried over 4 Å sieves). After purging the system with nitrogen ($N_2$), 5.10 g of anhydrous aluminum chloride $Al_2Cl_6$) was added and the mixture was allowed to stir at reflux under a $N_2$ atmosphere for 5 days in the absence of light.

After approximately 1 hour the mixture developed a purple color. This color continued to increase in intensity until the mixture was black in appearance (~8 hrs).

After 5 days the reaction mixture was filtered under $N_2$ atmosphere. The filtrate was colorless and the resulting solid product obtained was burgundy in color and was utilized as the catalyst material for the cracking experiment described below. The catalyst was water-sensitive and turned white on exposure to moisture.

The catalyst gave an EPR signal indicative of a free-radical with a g value of 2.012.

If after the purple color first appears, to approximately 3 days, the mixture is filtered, the catalysts obtained will show an EPR signal which is very broad and has a g value of 2.06.

To determine catalyst cracking ability 1.0 g of catalyst is placed in a glass flow reactor with a gas mixture of hydrogen ($H_2$) and hydrogen chloride (HCl) in a 1:10 ratio containing heptane.

The gas mixture was allowed to flow thru the catalyst at 110° C. Gas chromatographic analysis of the product stream revealed methane, acetylene, ethylene, propane, isobutane, and n-butane as major reaction products. Products in greatest abundance were propane, isobutane, and n-butane.

The temperature of the catalyst/reaction zone was increased to 175° C. which resulted in an increase in the conversion of heptane to propane, n-butane, and isobutane. A greater than 1000-fold increase in the conversion resulted with a 95-99% selectivity to propane, n-butane, and isobutane.

EXAMPLE 2

The method of Example 1 was repeated utilizing the catalyst composition thereof and flowing a 1:10 ratio of $H_2$:HCl gas containing n-pentane as the substrate cracked through a flow reactor.

The gas mixture was allowed to flow through the catalyst at 110° C. Gas chromatographic analysis of the product stream revealed methane, ethylene, propane, isobutane, n-butane, and isopentane as the major reaction products. Products in greatest abundance were propane, n-butane, and isobutane.

The temperature of the catalyst/reaction zone was increased to 175° C. which resulted in an increase in the conversion of n-pentane to propane, n-butane, and isobutane. A greater than 90% selectivity towards propane, n-butane, and isobutane was observed.

EXAMPLE 3

In a 250 ml 3-neck round bottom flask equipped with a reflux condensor and a teflon coated magnetic stir bar was placed 15.0 g acid alumina (dried at 150° C.) and 175 ml of carbon tetrachloride (dried over 4 Å sieves). After purging the system with nitrogen ($N_2$), 7.5 g anhydrous aluminum chloride ($Al_2Cl_6$) was added and the mixture was allowed to stir at reflux under a $N_2$ atmosphere for 2 days.

After approximately 1 hour the mixture developed a purple color and this color increased in intensity until the mixture was black in appearance.

After 2 days the reaction mixture was cooled and the mixture filtered under a $N_2$ atmosphere. The filtrate had a slight red color and the resulting solid product obtained was purple in appearance. This solid product was utilized as the catalyst material for the cracking experiment described below.

The catalyst was water-sensitive and turned white on exposure to moisture. The catalyst gave an EPR signal indicative of a free-radical with a g value of 2.012.

To determine catalyst cracking ability—2.0 g of catalyst was placed in a glass flow reactor with a gas mixture of $H_2$:HCl in a 1:10 ratio by volume containing n-pentane.

The gas mixture was allowed to flow thru the catalyst 175° C. Gas chromatographic analysis of the product stream revealed methane, ethylane, ethane, propane, isobutane, n-butane, and isopentane as the major reaction products. There was greater than 90% selectivity to propane, n-butane, and isobutane.

EXAMPLE 4

In a 500 ml 1-neck round bottom flask equipped with a reflux condensor and teflon coated magnetic stir bar was placed 30.0 g hydroxylated titanium oxide and 300 ml carbon tetrachloride (dried over 4 Å sieves). After purging system with nitrogen ($N_2$), 15.0 g anhydrous aluminum chloride ($Al_2Cl_6$) was added and the mixture was allowed to stir at reflux under a $N_2$ atmosphere for 3 days.

After a few hours the mixture developed a slight pink color which gradually increased in darkness to a peach color after 1 day.

After 3 days the reaction mixture was cooled and the mixture filtered under a $N_2$ atmosphere. The filtrate was colorless and the solid reaction product was peach in color. This solid product was utilized as the catalyst material for the following cracking experiment.

The catalyst was water-sensitive and turned white on exposure to moisture. The catalyst gave an EPR signal indicative of a free-radical with a g value of 2.013.

To determine catalyst cracking ability—2.0 g of catalyst is placed in a glass flow reactor with a gas mixture of $H_2$:HCl in a 1:10 ratio by volume containing n-pentane.

The gas mixture was allowed to flow through the catalyst at 175° C. Gas chromatographic analysis of the product stream revealed methane, ethylene, ethane, propane, isobutane, n-butane, and isopentane as the major reaction products with a greater than 80% selectivity to propane, n-butane, and isobutane.

EXAMPLE 5

The method of Example 1 was repeated utilizing the catalyst composition thereof and flowing a 1:10 ratio by volume of $H_2$:HCl gas containing dodecane.

The gas mixture was allowed to flow through the catalyst at 175° C. Gas chromatographic analysis of the product stream revealed methane, acetylene, ethylene, propane, isobutane, n-butane, and the dichloroethanes as the major reaction products. A selectivity of 90–98% to propane, n-butane, and isobutane was observed.

EXAMPLE 6

The method of Example 1 was repeated utilizing the catalyst composition thereof and flowing a 1:4 ratio by volume of $H_2$:HCl gas containing n-hexane as the reactant.

The gas mixture was allowed to flow through the catalyst at 110° C. Gas chromatographic analysis of the resultant product stream revealed methane, propene, propane, and n-butane as the major reaction products.

The temperature of the catalyst/reaction zone was increased to 175° C. and 200° C. Gas chromatographic analysis of the resultant product stream revealed methane, propane, isobutane, and n-butane as the major reaction products.

When the temperature of the catalyst/reaction zone was increased to 225° C. gas chromatographic analysis revealed that methane and propane were the major reaction products with ethylene and n-butane the next most abundant.

EXAMPLE 7

Pumpoil was vapor deposited onto the catalyst composition from Example 1 using a stream of nitrogen. The catalyst composition with the pumpoil was then placed in a glass flow reactor and a gas mixture of $H_2$:HCl in a 1:4 ratio by volume was passed over the catalyst.

The gas mixture was allowed to flow through the catalyst at 110° C. Gas chromatographic analysis of the product stream revealed propane and n-butane as the major reaction products.

The temperature of the catalyst/reaction zone was increased to 175° C. Gas chromatographic analysis of the product stream indicated that propane, n-butane, and methyl chloride were the major reaction products. Some indication that polychlorinates higher than $C_1$ were products (1,1- and 1,2-dichloroethane).

The temperature of the catalyst/reaction zone was increased to 200° C. Gas chromatographic analysis of the product stream indicated propane and n-butane as major products.

The temperature of the catalyst/reaction zone was increased to 250° C. Gas chromatographic analysis of the product stream revealed that methane, propene, isobutene, and 1-butene were major reaction products.

In each case as the temperature was increased the amount of products formed increased.

EXAMPLE 8

The method of Example 1 was repeated utilizing the catalyst composition thereof and flowing a 1:10 ratio by volume of $H_2$:HCl gas containing n-pentane.

The gas mixture was allowed to flow through the catalyst at 175° C. Gas chromatographic analysis of the product stream revealed methane, ethylene, propane, isobutane, n-butane, and isopentane. A greater than 75% selectivity towards propane, isobutane, and n-butane was observed.

If the flow rate of the gas mixture was decreased by a factor of two a greater than 97% selectivity towards propane, isobutane and n-butane with a corresponding increase in the percent conversion of reactant was observed.

If the rate of the gas mixture was held constant and the path length of the catalyst/reaction zone was doubled a similar increase in catalyst activity and selectivity was observed.

EXAMPLE 9

Activated carbon (charcoal heated to 325° C. under vacuum for 48 hours) was physically mixed with the catalyst composition from Example 1 and placed in a glass flow reactor. A gas mixture of $H_2$:HCl in a 1:4 ratio was passed over the catalyst.

The gas mixture was allowed to flow through the catalyst at 110° C. Gas chromatographic analysis of the product stream revealed methyl chloride and ethyl chloride as the major reaction products.

The temperature of the catalyst/reaction zone was increased to 165° C. Gas chromatographic analysis of the product stream revealed methyl chloride and ethyl chloride as the major reaction products. The activity of the catalyst increased with increasing temperature. Methylene chloride was also produced.

If when the catalyst decreased in activity the catalyst mixture was agitated the original activity of the system could be reattained. Catalyst activity for this carbon source was considerably lower than that of other carbon sources.

EXAMPLE 10

The method of Example 9 was utilized using the catalyst composition thereof with coal as the carbon source.

The gas mixture was allowed to flow through the catalyst at 110° C. Gas chromatographic analysis of the product stream revealed methane, methyl chloride, and ethyl chloride as the major reaction products. Methylene chloride was also produced.

The temperature of the catalyst/reaction zone was increased to 175° C. Gas chromatographic analysis of the product stream revealed methane, methyl chloride, and ethyl chloride as major reaction products. The activity of the catalyst increased with increasing temperature and the system could be regenerated by agitation of the catalyst/reaction mixture.

Catalyst activity for this carbon source was slightly greater than the activity for activated charcoal.

EXAMPLE 11

The method of Example 9 was utilized using the catalyst composition thereof with a sample of resid from Amoco (FHC-353).

The gas mixture was allowed to flow through the catalyst at 110° C. Gas chromatographic analysis of the product stream revealed methane, propane, isobutane, and n-butane as major reaction products. Catalyst activity increased with increasing temperature.

EXAMPLE 12

Vinyl chloride monomer heavy ends material (supplied by Vulcan Chemical) was placed in the leading edge of the catalyst in a glass flow reactor. A gas mixture of $H_2$:HCl in a 1:4 ratio by volume was passed through the catalyst.

The gas mixture was allowed to flow through the catalyst at 170° C. Gas chromatographic analysis of the product stream revealed methane, propane, methyl chloride, isobutane, ethyl chloride, and 1-chloropropane as major reaction products. The presence of polychlorinated hydrocarbons was also observed.

EXAMPLE 13

The method of Example 1 was utilized with the catalyst composition thereof using carbon monoxide as the carbon source and passing a gas mixture of $H_2$:HCl:CO in a 3:1:1 ratio by volume through the catalyst.

The gas mixture was allowed to flow through the catalyst at 110° C. Gas chromatographic analysis of the product stream revealed at the limit of the GC detector small amounts of methyl chloride and ethyl chloride.

The temperature of the catalyst/reaction zone was increased to 165° C. Gas chromatographic analysis of the product stream revealed at the limit of GC detection small amounts of methyl chloride and ethyl chloride.

The temperature of the catalyst/reaction zone was increased to 200° C. Gas chromatographic analysis showed the same results as the previous two temperatures.

The temperature of the catalyst/reaction zone was increased to 250° C. Gas chromatographic analysis of the product stream showed significant amounts of methane and traces of methyl chloride and ethyl chloride.

The catalyst has only minimal activity towards hydrogenation of carbon monoxide.

EXAMPLE 14

The method of Example 1 was repeated utilizing the catalyst composition thereof and flowing a 1:4 ratio by volume of $H_2$:HCl gas containing dimethyl ether as the reactant.

The gas mixture was allowed to flow through the catalyst at 110° C. Gas chromatographic analysis of the product stream revealed methane, methyl chloride, methanol and ethyl chloride as the major products.

EXAMPLE 15

In a 500 ml round bottom flask equipped with a teflon coated magnetic stir bar and a reflux condensor was placed 10.16 g of silica gel and 200 ml of methylene chloride (dried over 4 Å sieves). After purging with nitrogen ($N_2$), 5.07 g anhydrous aluminum chloride ($Al_2Cl_6$) was added and the mixture was allowed to stir at reflux for 5 days.

After 5 days the light purple reaction mixture was cooled and the mixture was filtered under a $N_2$ atmosphere. The filtrate was colorless and the resulting solid product obtained was light purple in appearance and was utilized as the catalyst material for the following cracking experiment.

The catalyst gave an EPR signal indicative of a free-radical with a g value of 2.012.

Approximately 1.0 g of catalyst was placed in a glass flow reactor with a gas mixture of $H_2$ and HCl in a 1:10 ratio containing n-pentane.

The gas mixture was allowed to flow through the catalyst at 175° C. Gas chromatographic analysis of the product stream revealed propane, isobutane, and n-butane as the major reaction products. A greater than 50% selectivity towards propane, isobutane, and n-butane was observed. The activity of the system for conversion of n-pentane was more than 3 orders of magnitude less than for the catalysts prepared in $CCl_4$.

EXAMPLE 16

The method of catalyst preparation for Example 15 was utilized with chloroform as the solvent.

The resultant catalyst composition was placed in a glass flow reactor with a gas mixture of $H_2$:HCl in a 1:10 ratio containing n-pentane.

The gas mixture was allowed to flow through the catalyst at 175° C. Gas chromatographic analysis of the product stream revealed propane, isobutane, and n-butane as major reaction products.

The activity of the system for conversion of n-pentane was of the same order of magnitude as the catalysts prepared in $CCl_4$.

EXAMPLE 17

In a 1000 ml round bottom flask equipped with a reflux condensor was placed 100 g silica gel and 750 ml benzene (dried over 4 sieves). After purging with nitrogen ($N_2$), 50 g anhydrous aluminum chloride was added and the mixture was allowed to stir at reflux for 2 days.

After 2 days the black reaction mixture was cooled and filtered under $N_2$. The filtrate was clear and the resulting black solid product was utilized as the catalyst material for the following cracking experiment.

The catalyst gave an EPR signal with a g value of 2.012.

Approximately 1.0 g of catalyst was placed in a glass flow reactor with a gas mixture of $H_2$:HCl in a 1:10 ratio containing n-pentane.

The gas mixture was allowed to flow through the catalyst at 175° C. Gas chromatographic analysis of the product stream revealed methane, propane, isobutane, and n-butane as major reaction products. The activity of this catalyst was much less than that of the other catalysts made in $CCl_4$, $CHCl_3$, and $CH_2Cl_2$. The catalyst activity was greater than 4 orders of magnitude less than the catalysts made in $CCl_4$.

EXAMPLE 18

The method of catalyst preparation for Example 17 was utilized using carbon tetrachloride as solvent.

The resulting burgundy catalyst composition was used in the cracking process outlined in Example 2. The products obtained from this system were identical to that in Example 2.

EKAMPLE 19

The method of catalyst preparation for Example 15 was utilized with n-hexane as the solvent.

The resultant yellow catalyst composition gave an EPR signal with a g value of 2.011.

The catalyst slowly turned purple on exposure to air and decomposed upon contact with water.

2.0 g of catalyst was placed in a glass flow reactor with a gas mixture of $H_2$:HCl in a ratio of 1:10 containing n-pentane.

The gas mixture was allowed to flow through the catalyst at 175° C. Gas chromatographic analysis of the product stream revealed propane, isobutane, and n-butane to be the major reaction products. The activity of this system was 3 orders of magnitude lower than that of the previous systems prepared in $CCl_4$.

EXAMPLE 20

The method of catalyst preparation for Example 3 was utilized with chloroform (ethanol removed and dried over 4 Å sieves) as the solvent.

The resulting catalyst composition as used in the cracking process in Example 3. The products obtained from this system were identical to that in Example 3.

EXAMPLE 21

In a 250 ml 1-neck round bottom flask equipped with a reflux condensor and a teflon coated magnetic stir bar was placed 5.00 g activated alumina (heated to 400° C.) and 175 ml of cyclohexane (dried over 4 Å sieves). After purging system with Nitrogen ($N_2$), 1.00 g Aluminum chloride was added and the mixture was stirred at reflux under a $N_2$ atmosphere for 16 hours.

After 16 hours the reaction mixture was cooled and the mixture filtered under a $N_2$ atmosphere. The filtrate was colorless and the catalyst obtained was light yellow.

To determine the catalyst cracking ability 1.0 g of catalyst is placed in a glass flow reactor with a gas mixture of $H_2$:HCl in a 1:10 ratio by volume containing n-pentane.

The gas mixture was allowed to flow through the catalyst at 175° C. Gas chromatographic analysis of the product stream revealed methane, ethylene, propene, propane, methyl chloride, isobutane, and n-butane for all products except isopentane is greater than 3 orders of magnitude less active than the catalyst prepared carbon tetrachloride.

EXAMPLE 22

In a 250 ml 1-neck round bottom flask equipped with a reflux condensor and a teflon stir bar was placed 5.00 g activated acid alumina (heated to 400° C.) and 175 ml of dichloroethane (dried over 4 Å sieves). After purging the system with Nitrogen ($N_2$), 1.00 Aluminum chloride was added and the mixture was allowed to stir at reflux under a $N_2$ atmosphere for 16 hours.

After 16 hours the reaction mixture was cooled and the mixture filtered under a $N_2$ atmosphere. The filtrate was colorless and the catalyst obtained was lavender in color.

To determine the catalyst cracking ability 2.0 g of catalyst is placed in a glass flow reactor with a gas mixture of $H_2$:HCl in a 1:10 ratio by volume containing n-pentane.

The gas mixture was allowed to flow through the catalyst at 175° C. Gas chromatographic analysis of the product stream revealed methane, ethylene, methyl chloride, isobutane, n-butane, and isopentane as reaction products. Catalyst activity for all products was greater than 3 orders of magnitude less active than the catalyst prepared in carbon tetrachloride.

EXAMPLE 23

The method of Example 1 was repeated utilizing the catalyst composition thereof and flowing HCl gas containing n-pentane as the reactant.

The gas mixture was allowed to flow through the catalyst at 180° C. Gas chromatographic analysis of the product stream revealed methane, ethylene, propylene, isobutylene, and 1-butene as the major products.

EXAMPLE 24

The following experiment was conducted to demonstrate the free-radical polymerization initiating ability of the catalyst.

A catalyst composition from Example 1,2,3 and 17 were each placed in a 250 ml batch reactor vessel with 75 ml of a solvent such as carbon tetrachloride or toluene. An olefin such as styrene, isobutylene, ethylvinyl ether or 1-hexene was added and the reaction mixture stirred at room temperature. The reaction proceeds readily and the polymer was isolated in high yield.

If an olefin such as methyl methacrylate, methylvinyl ketone or vinylacetate is used the polymer obtained is in lower yield.

EXAMPLE 25

The fdllowing example shows that the polymerization is free-radical initiated.

The catalyst composition of Example 1 was placed in a 250 ml batch vessel with 75 ml of toluene. To this was added 30 ml of a 1:1 mole ratio of styrene:methyl methacrylate. The mixture was allowed to stir at room temperature for 1 hour, then the copolymer was isolated in high yield. The copolymer isolated had a 2:1 ratio of styrene:methyl methacrylate which is indicative of a free-radical polymerization.

EXAMPLE 26

The following example demonstrates the use of alternative chlorine sources other than HCl.

The method of Example 1 was repeated utilizing the catalyst composition thereof and flowing hydrogen gas containing carbon tetrachloride as chlorine source and n-pentane as the reactant.

The gas mixture was allowed to flow through the catalyst at 175° C. Gas chromatographic analysis of the product stream revealed methane, ethylene, propane, isobutane, n-butane, and isopentane as products. A greater than 95% selectivity towards propane, isobutane, and n-butane was observed. The activity of this system equalled or surpassed that of the systems containing HCl as the chlorine source.

EXAMPLE 27

The following example shows that the cracking reaction may be carried out in the liquid phase.

In a 500 ml parr pressure bottle apparatus 100 ml of carbon tetrachloride and 7.33 ml hexadecane was added and degassed using nitrogen. Next 2.7 g of the catalyst composition from Example 1 was added and the pressure apparatus sealed.

The pressure apparatus was then purged 5 times with 23 psi hydrogen and then filled with 23 psi hydrogen. The pressure apparatus was placed in an oil bath at 80° C. and allowed to stir for 18 hours.

At the end of 8 hours a sample of the gas mixture above the solution showed products identical to those obtained in Example 5.

We claim:

1. A method of preparing a catalyst comprising reacting an adsorbent solid containing surface hydroxyl groups with a Lewis acid selected from the group consisting of aluminum halides, antimony halides and mixtures thereof in a halogenated organic solvent selected from the group consisting of $CCl_4$, $CHCl_3$ and mixtures thereof at a temperature at atmospheric pressure below about 250° C. and for a time sufficient for said aluminum or antimony halide to react with at least a portion of said surface hydroxyl groups.

2. The method of claim 1 wherein said reaction product is separated from the reaction mixture.

3. The method of claim 1 or 2 wherein said adsorbent solid containing surface hydroxyl groups is selected from the group consisting of materials containing silica, alumina, titania, boron oxide, a zeolite, magnesia or mixtures thereof.

4. The method of claim 3 wherein said adsorbent solid containing surface hydroxyl groups is silica gel.

5. The method of claim 3 wherein said adsorbent solid containing surface hydroxyl groups is alumina.

6. The method of claim 3 wherein said adsorbent solid containing surface hydroxyl groups is titanium oxide.

7. The method of claim 1 or 2 wherein said reaction is effected at a temperature from about 50° C. to about 80° C.

8. The method of claim 7 wherein said Lewis acid is aluminum chloride or antimony chloride.

9. The method of claim 1 or 2 wherein said halogenated organic solvent is $CCl_4$.

10. The method of preparing a catalyst comprising reacting an adsorbent solid containing surface hydroxyl groups with aluminum chloride or antimony chloride in a solvent consisting essentially of $CCl_4$, $CHCl_3$ or mixtures thereof at about reflux temperature for a time sufficient for said aluminum or antimony chloride to react with at least a portion of said surface hydroxyl groups.

11. The method of claim 10 wherein said adsorbent solid containing surface hydroxyl groups is a silica containing material.

12. The method of claim 11 wherein said silica containing material is silica gel.

13. The method of claim 10 wherein said adsorbent solid containing surface hydroxyl groups is an alumina containing material.

14. The method of claim 10 wherein said adsorbent solid containing surface hydroxyl groups is a titanium oxide containing material.

15. The catalyst prepared according to the method of claim 2.

16. The catalyst prepared according to the method of claim 4.

17. The catalyst prepared according to the method of claim 5.

18. The catalyst prepared according to the method of claim 6.

19. The catalyst prepared according to the method of claim 8.

20. The catalyst prepared according to the method of claim 9.

21. The catalyst prepared according to the method of claim 10.

22. The catalyst prepared according to the method of claim 11.

23. The catalyst prepared according to the method of claim 12.

24. The catalyst prepared according to the method of claim 13.

25. The catalyst prepared according to the method of claim 14.

* * * * *

UNITED STATES PATENT AND TRADEMARK OFFICE
CERTIFICATE OF CORRECTION

PATENT NO. : 4,719,190
DATED : January 12, 1988
INVENTOR(S) : Russell S. DRAGO, ET AL It is certified that error appears in the above-identified patent and that said Letters Patent is hereby corrected as shown below:

In column 1, under the title of the invention, please add the following:

-- Research leading to the completion and reduction to practice of the invention was supported, in part, by Grant No. 8213398 issued by the National Science Foundation (NSF). The United States Government has certain rights in and to the claimed invention. --

Signed and Sealed this

Thirtieth Day of November, 1993

Attest:

BRUCE LEHMAN

Attesting Officer

Commissioner of Patents and Trademarks